J. C. HARPER.
GUARD FOR LEVER OPENINGS.
APPLICATION FILED OCT. 26, 1920.
1,402,603.
Patented Jan. 3, 1922.
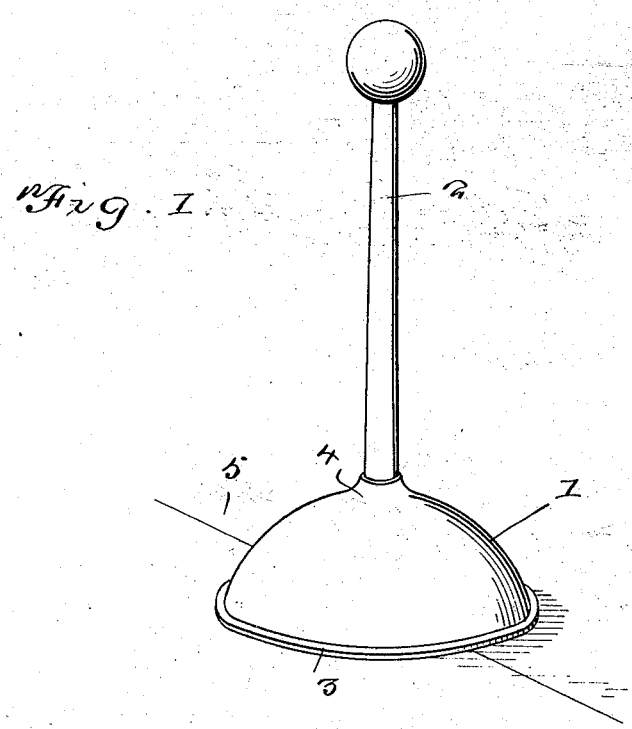
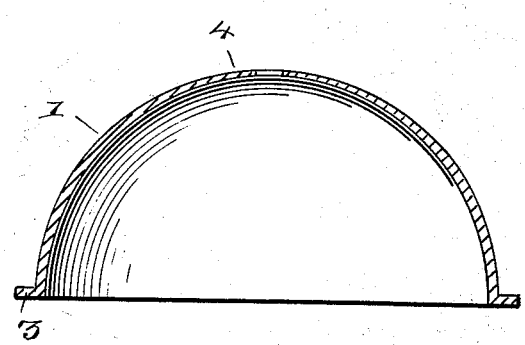
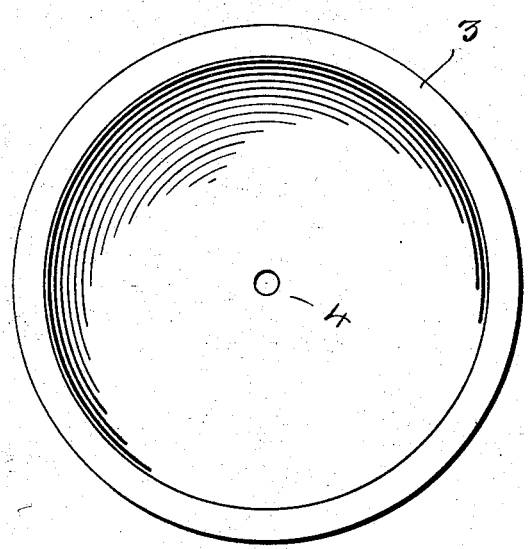
J. C. Harper
INVENTOR
BY Victor J. Evans
ATTORNEY
WITNESS:

UNITED STATES PATENT OFFICE.

JESSE COOPER HARPER, OF WAYCROSS, GEORGIA.

GUARD FOR LEVER OPENINGS.

1,402,603.      Specification of Letters Patent.      Patented Jan. 3, 1922.

Application filed October 26, 1920. Serial No. 419,686.

*To all whom it may concern:*

Be it known that I, JESSE COOPER HARPER, a citizen of the United States, residing at Waycross, in the county of Ware and State of Georgia, have invented new and useful Improvements in Guards for Lever Openings, of which the following is a specification.

My present invention has for its object the provision of a guard for lever openings that is simple and inexpensive in construction, susceptible of ready application to a gear shift lever, or other lever without the assistance of extraneous means, and is efficient in preventing dust and dirt from gaining access to the joint of the lever.

To the attainment of the foregoing and other objects hereinafter developed, the invention consists in the improvement as hereinafter described and definitely claimed.

In the accompanying drawings hereby made a part hereof:

Figure 1 is a perspective showing the application of my novel guard.

Figure 2 is an enlarged diametrical section of the guard per se.

Figure 3 is an inverted plan of the guard per se.

Similar numerals of reference designate corresponding parts in all of the views of the drawings.

My novel guard 1 is mounted on a gear shift lever 2 or any other automobile lever in the manner as shown and in such manner as not to interfere with the removal of a floor mat or board in the bottom of a car body.

The guard is of general inverted cup configuration and is provided with an outwardly directed base flange 3. The major portion of the guard is formed, by preference, of rubber composition, and in the center of the said major portion is an annular comparatively elastic apex 4, the function of which is to permit of the guard being slipped over the upper end of the lever incident to the application of and removal of the guard while possessing the capacity of yieldingly pressing against and tightly hugging the lever so as to preclude the passage of dust between the two. The said comparatively elastic annular apex 4 is preferably of rubber or equivalent material and is preferably joined to the major portion of the guard by vulcanization.

The concaved under side of the guard is adapted to rest over the ball joint of the lever 2, and the guard is adapted to frictionally bear upon the mat indicated by 5 so as to easily slip or slide on the mat when the lever is shifted from one position to another. From this it follows that my novel guard will accommodate itself to all movements of the lever 2 and will operate efficiently in all positions of the lever in the performance of the function ascribed to it. In this connection, it will be appreciated that the guard will always be held snugly to the mat by the elastic or resilient quality of the apex 4; also, that no extraneous means whatever is necessary for the attachment of the guard to the lever. It will be further appreciated that the guard is adapted to be applied or removed without the employment of skilled labor, and that the guard is compact and neat in appearance, and is adapted to accommodate itself to various sizes and styles of levers.

What I claim, is:—

1. A guard for gear shift lever and other openings, comprising a major portion of inverted cup shape with an outwardly directed base flange; said major portion being formed of rubber composition, and a comparatively elastic annular apex in the center of the major portion and joined thereto.

2. As a new article of manufacture, a guard for lever openings, of inverted cup shape, formed of elastic material and having an opening to receive a lever and also having means about the said opening to exert yielding pressure against and hug the lever to preclude the passage of dust between the two, and to assure movement of the guard with the lever.

3. As a new article of manufacture, a guard for lever openings, of inverted cup shape, formed of elastic material and having an opening to receive a lever and also having means about the said opening to exert yielding pressure against and hug the lever to preclude the passage of dust between the two, and to assure movement of the guard with the lever; the said guard also having a base flange.

In testimony whereof I affix my signature.

JESSE COOPER HARPER.